United States Patent [19]

Beston et al.

[11] 4,107,344
[45] Aug. 15, 1978

[54] METHOD OF PRODUCING DEHYDRATED RICE FLAKES

[75] Inventors: George H. Beston, Cobourg; Donald W. Kirk, Toronto, both of Canada

[73] Assignee: General Foods Limited, Toronto, Canada

[21] Appl. No.: 690,138

[22] Filed: May 26, 1976

[30] Foreign Application Priority Data

May 26, 1975 [CA] Canada .................................. 227742

[51] Int. Cl.² .......................... A23L 1/18; A23L 1/168
[52] U.S. Cl. .................................... 426/625; 426/654; 426/457
[58] Field of Search ............................... 426/618–621, 426/625, 627, 640, 457, 459, 463, 464, 388, 549, 560, 456, 458

[56] References Cited

U.S. PATENT DOCUMENTS

| | | | |
|---|---|---|---|
| 2,727,822 | 12/1955 | Kimball | 426/627 |
| 3,432,309 | 3/1969 | Lynn | 426/463 |
| 3,484,249 | 12/1969 | Tanaka | 426/627 |
| 3,690,894 | 9/1972 | Kelly | 426/463 |
| 3,860,735 | 1/1975 | Hoshino | 426/458 |
| 3,982,032 | 9/1976 | Korzumi | 426/458 |

FOREIGN PATENT DOCUMENTS

| | | | |
|---|---|---|---|
| 618,524 | 2/1949 | United Kingdom | 426/621 |
| 1,235,557 | 6/1971 | United Kingdom | 426/457 |

*Primary Examiner*—Hiram H. Bernstein
*Attorney, Agent, or Firm*—T. V. Sullivan; H. J. Newby; M. D. Bittman

[57] ABSTRACT

A method of producing dehydrated rice flakes wherein dehydration of an aqueous slurry of substantially completely gelatinized rice starch granules and gelatinization and dehydration of a minor proportion of admixed ungelatinized rice starch granules is concurrently effected with a drum dryer. The dried sheet of substantially completely gelatinized rice material from the dryer is then subdivided into flakes or small platelets which require only the addition of hot water to quickly rehydrate to form a cooked rice product having the appearance and textural quality approaching that of freshly cooked mashed potatoes.

7 Claims, No Drawings

METHOD OF PRODUCING DEHYDRATED RICE FLAKES

FIELD OF THE INVENTION

This invention relates to an improved method of producing dehydrated rice flakes and, more particularly, is directed to a novel method for the production of rice flakes which quickly reconstitute upon the addition of hot water to yield a rice product which has substantially the appearance and mealy textural quality of freshly prepared mashed potatoes.

Description of the Prior Art

Precooked rice in the form of dehydrated, gelatinized rice grains which reconstitute to form products similar to those obtained by boiling commodity rice in water is well known in the prior art. An exemplary method of producing dehydrated precooked rice grains of the quick-cooking or "instant" type which has enjoyed wide commercial success is disclosed in Canadian Pat. No. 566,677.

Whereas quick-cooking dehydrated mashed potato flakes, such as those described in U.S. Pat. No. 3,535,128 have also received considerable consumer acceptance, prior to the present invention, the production of dehydrated, gelatinized rice flakes which reconstitute to form a comestible having the appearance and textural attributes of freshly cooked mashed potatoes and the flavor of freshly cooked rice, has not been manifested.

Although various processes for the production of dehydrated rice flakes from either polished or unhulled rice have been proposed, all such methods, apparently, suffer from one or more drawbacks as attested to by their lack of commercial success.

Gurjar (U.S. Pat. No. 1,377,125) describes a flaked rice product made directly from unhulled field rice, the so-called "paddy." This product, although having certain nutritional advantages over unenriched polished rice, has the crushed hull embedded into the finished flaked mass of individual rice kernels and, as such, does not conform to the appearance requirements anticipated by the housewife for a rice product and does not reconstitute to a rice dish similar in color and texture to mashed potatoes.

E. O. Stokkebye, recognizing that rice has mechanical and physical properties as well as a chemical structure which differ from other cereals which have been successfully flaked, suggests that these differences are the causes of failure of prior attempts to apply the experience obtained with other cereals to rice when making flakes. He has suggested in U.S. Pat. No. 2,064,701 a method for flattening individual rice grains into a flake-type shape (the grains do not completely lose their identify) after subjecting the rice to heat and moisture to the extent the grains contain no more than 20% moisture at the time of being compressed to a flattened form wherein the grains obtain a porcelain-like semi-transparent appearance.

As is known in the art, rice to be substantially completely gelatinized must be subjected to processing conditions wherein it has imbibed at least about 35% by weight moisture (cf. U.S. Pat. No. 2,498,573). The process of Stokkebye, therefore, while avoiding the problem of having a sticky rice paste which adheres to the compression rollers and renders it impossible to produce an article fit for trade, yields a substantially ungelatinized rice product which does not reconstitute upon the addition of hot water to a completely cooked product. Rather, the product of the Stokkebye process consists of partially gelatinized and flattened rice kernels which require additional processing (gelatinization) before being fully cooked.

Accordingly, prior to the instant invention, an unfilled need has existed for a method to produce precooked rice in dehydrated flake form which, upon reconstitution with hot water and a minimum of fluffing with a fork, yields a mashed rice product which closely resembles freshly cooked mashed potatoes in appearance and texture and has the appealing flavor of freshly cooked rice.

Briefly, the invention is accomplished by a method of producing rice flakes which comprehends cooking polished rice to substantially complete gelatinization; subdividing the gelatinized rice to a flour; augmenting the gelatinized flour with a minor proportion of uncooked rice flour; adding sufficient water to produce a film-forming slurry; drum drying the slurry; and subdividing the dried film of slurry into flakes or platelets of appropriate dimensions.

Alternatively, the cooked rice can be wet milled to a fine slurry and the uncooked rice flour added to the slurry. Employing this technique avoids the necessity of drying the cooked rice to a flour prior to forming the composite slurry for drum drying.

In view of the unsuccessful attempts by those in the art to produce gelatinized dehydrated rice flakes of acceptable quality, the unexpected results of the teachings of the present invention are attributed to the discovery that an aqueous slurry of a mixture of gelatinized rice particles of small size with a minor amount of uncooked small rice particles can be effectively processed in a drum drier.

Clean polished rice, with or without a talc coating, constitutes the basic starting material for the method and product of the invention. While most all commercially available varieties of rice of high quality are suitable and will yield acceptable products, the long and medium grain varieties of which Blue Bonnet, Blue Belle, Patna, and Star Bonnet are representative preferred for processing according to the inventive method with Blue Bonnet or Star Bonnet being the most preferred.

The raw polished rice can be cooked by any of the well-known methods such as immersion cooking in boiling water, steam cooking or a combination of both methods. Although the method of cooking the rice is not particularly critical, the degree to which the rice is gelatinized by any of the above methods is important for the attainment of a product having the desirable texture quality of freshly cooked mashed potatoes. The rice should be cooked to the point of being substantially completely gelatinized and should not be overcooked. The preferred degree of cooking is best established by a moisture analysis whereat, depending upon the variety, the substantially completely gelatinized rice will have a moisture content ranging from about 35% to about 40%. Typically, long or medium grain rice cooked in an excess of water boiling at about 215° F for about 15 minutes will become substantially gelatinized.

Excess moisture is drained from the cooked rice and it is then dried to a moisture content of about 8% – 10% by any convenient method. Drying is preferably accomplished by subjecting the drained cooked rice to heated air stream under operating conditions such that the dried rice will not toast or otherwise burn.

The dried rice grains are then subdivided by passing them through an attrition or impact mill wherein the rice grains are milled to a material having a particle size distribution such that 100% of the material passes through a 40 mesh screen.

Uncooked polished rice, not necessarily of the same variety as that above, but preferably so, is dry milled to a flour having substantially the same particle size distribution as that of the cooked rice. The uncooked rice flour is added to the cooked rice flour in an amount equivalent to from about 10 to about 30 weight per cent of the gelatinized rice. Preferably, the slurry should contain a mixture of gelatinized rice solids and uncooked rice solids in a respective weight ratio of 4 to 1. A suitable slurry is prepared by mixing the flours with water in the ratio of 1 part flour to 1.5 parts of water.

The addition of the uncooked rice flour to the gelatinized rice flour lends a textural enhancement to the prepared rice dish which favorably compares with that of well prepared mashed potatoes.

A further improvement in the texture of the reconstituted product of the invention is obtained by the addition of a small, but effective amount of an emulsifying agent to the slurry of cooked and uncooked rice. In most instances the amount of emulsifiers added to the slurry prior to further processing should be the equivalent of incorporating the emulsifier in the finished dehydrated product at a level of from about 0.10 to 0.50 weight per cent with 0.25% considered most preferable. Such emulsifiers as glyceryl monostearate, glyceryl monobutyrate and glyceryl monopalmitate are suitable at the above levels for improving the textured quality of the rehydrated product. Glyceryl monostearate at a level of 0.25 weight percent in the dehydrated flaked rice contributes significant textural improvement, based on the consensus of judgements of those skilled in the art of food evaluation.

The slurry of fine rice solids and emulsifier is then passed to a drum drier. The slurry is deposited on the drier roll surface in the form of a thin film which is dried into sheets of dehydrated rice having a thickness of from about 0.005 to about 0.015 inches.

A most satisfactory drum drying processing operation is brought about when, employing an atmospheric double drum dryer, the gap between rolls is maintained at 0.01 inches; the rolls maintained at a surface temperature of 250° F; and the drying rate maintained at 5 to 10 lbs of dried product/sq ft of drying surface/hour.

During the drum drying operation as described above, the uncooked finely ground rice, in the presence of moisture and the heated drier rolls, becomes partially gelatinized coincidentally with the dehydration of the slurry and the doctoring of the dried sheet of composite rice from the dryer rolls.

The thin sheet of dried, substantially completely gelatinized rice material doctored from the drum dryer rolls can be readily subdivided into flakes or platelets of desired dimensions by being passed through a conventional mill such as a hammer or impact-type mill. For the most part, platelets having a maximum dimension of about ⅜ inch are preferred and can be obtained by milling the dried (6% – 10% moisture) sheets of rice solids from the drum dryer in a Fitz Mill (Trade Mark) (with no screen) at a feed rate of approximately 100 lbs/hr.

The product of the method of the invention is appropriately described as platelets of substantially completely gelatinized rice solids having a thickness of about 0.01 inches, a maximum dimension of about ⅜ inch and a moisture content of about 8 weight percent by weight.

The unique product of the invention readily reconstitutes in hot water to form an appealing rice dish which has the enticing flavor of rice and the attractive appearance and mealy texture of freshly cooked mashed potatoes. A preferred method of preparing the rice dish is set forth in Example 2 hereinbelow.

In order that the present invention may be more clearly understood, reference will now be had to the following illustrative examples.

EXAMPLE I

A 3,632 gram quantity of milled, cooked and dried (8% moisture) long grain rice of the Star Bonnet variety was ground in a Fitz Mill (Trade Mark) to pass through a No. 1A screen. The resultant flour was finely divided enough to pass through a 40 mesh screen.

A 908 gram quantity of milled long grain rice was similarly ground and the two quantities were thoroughly mixed.

Sufficient water was added to produce a flowable slurry of about 60% water by weight.

A 16 gram quantity of glyceryl monostearate was added to the slurry of cooked and uncooked rice and the slurry was then applied to the drums of a Blaw Knox "Buflovak" (Trade Mark) Laboratory Double Drum Dryer, each drum having a 6 inch diameter and 8 inch length and set apart with a nip of 0.01 inch. The temperature of each drum was maintained at 250° F. The sheets of dried rice solids were readily doctored from the drums at a rate of 9.3 lb/hr and were determined to have a moisture content of 8% – 10%.

The dried sheets of rice solids were normally broken into smaller slabs which were passed through an impact mill operated at 3500 rpm to discharge platelets of rice at a rate of 100 lb/hr. The 0.01 inch thick rice platelets had an average maximum dimension of ⅜ inch.

EXAMPLE II

An appetizing rice dish was prepared by salting water (10 oz water, ½ tsp. salt) and bringing it to a boil. Immediately after removing the water from the heat, ½ cup of milk and 1 tablespoon of butter was added to the water followed by the addition of 85.5 g of the rice platelets of Example I. The contents were stirred and gently fluffed with a fork for about 15 seconds to a ready-to-serve rice dish which had excellent rice flavor and the appearance and texture of freshly cooked mashed potatoes.

As will be readily recognized by those skilled in the art, modifications of the method are possible and yet within the spirit of the invention. For example, by suitable control of slurry feed rate to the drum dryer, a large hold-up of slurry of uncooked and only partially cooked rice solids (instead of substantially completely gelatinized) could be maintained in the chamber between the rolls for a time interval sufficient to extend the degree of gelatinization of the rice solids to the desired degree before passing the slurry between the rolls to be dried.

Therefore, as various changes could be made in the above method and products without departing from the scope of the invention, it is intended that all matter contained in the above description shall be interpreted as illustrative and only such limitations should be imposed as are indicated by the spirit and scope of the appended claims.

The embodiments of the invention in which an exclusive property or privilege is claimed are defined as follows:

1. A method of preparing rice flakes which comprises drum drying an aqueous slurry of an admixture of about 70% to about 90% by weight of finely subdivided substantially completely gelatinized rice grains and about 10% to about 30% by weight of finely subdivided uncooked rice grains, and subdividing the drum dried sheet of dehydrated rice material into flakes.

2. A method of preparing dehydrated rice flakes which comprises:
   (a) drum drying an aqueous slurry of a composite of gelatinized rice solids and ungelatinized rice solids, said slurry containing on a weight basis 80 per cent gelatinized rice solids and 20 percent ungelatinized rice solids, and
   (b) subdividing the dehydrated rice material from the drum dryer into rice flakes having a thickness of about 0.01 inches and a maximum dimension of about $3/8$ inches.

3. A method of preparing dehydrated rice flakes which comprises:
   (a) cooking polished rice grains to a condition of substantially complete gelatinization,
   (b) preparing an aqueous slurry of the gelatinized rice grains,
   (c) wet milling the gelatinized rice grains to an average particle size of less than 40 mesh,
   (d) dry milling polished uncooked rice grains to an average particle size corresponding to less than 40 mesh size.
   (e) adding the milled uncooked rice grains to the slurry of milled gelatinized rice grains to form a slurry of the composite of subdivided grains wherein the weight ratio of gelatinized to ungelatinized rice grains is from about 9 to about 1 to about 3 to 1,
   (f) drum drying the aqueous slurry of composite grains to form a sheet of dehydrated rice material having a thickness of from about 0.05 to about 0.015 inches, and a moisture content ranging from about 6 to about 10 weight per cent, and
   (g) subdividing the dried sheet of rice material into rice flakes.

4. The method of claim 2 wherein a small but effective amount of an emulsifying agent is added to the slurry of cooked and uncooked rice prior to drum drying the slurry.

5. The method of claim 4 wherein the emulsifying agent is selected from the group consisting of glyceryl monostearate, glyceryl monobutyrate and glyceryl monopalmitate and is added at a level to incorporate about 0.25 weight percent in the finished dried product.

6. The method of claim 3 wherein a small but effective amount of an emulsifying agent is added to the slurry of cooked and uncooked rice prior to drum drying the slurry.

7. The method of claim 6 wherein the emulsifying agent is selected from the group consisting of glyceryl monostearate, glyceryl monobutyrate and glyceryl monopalmitate and is added at a level to incorporate about 0.25 weight percent in the finished dried product.

* * * * *